United States Patent
Reinecke Enriquez

(10) Patent No.: US 12,231,286 B2
(45) Date of Patent: Feb. 18, 2025

(54) SYSTEM AND METHOD FOR TWO-STAGE EVENT NOTIFICATION

(71) Applicant: RAKUTEN SYMPHONY, INC., Tokyo (JP)

(72) Inventor: Diego Reinecke Enriquez, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,455

(22) PCT Filed: Nov. 10, 2022

(86) PCT No.: PCT/US2022/049558
§ 371 (c)(1),
(2) Date: Dec. 22, 2022

(87) PCT Pub. No.: WO2024/102134
PCT Pub. Date: May 16, 2024

(65) Prior Publication Data
US 2024/0250863 A1    Jul. 25, 2024

(51) Int. Cl.
*H04L 41/0604* (2022.01)
*H04L 41/5022* (2022.01)
*H04L 41/5074* (2022.01)

(52) U.S. Cl.
CPC ...... *H04L 41/0609* (2013.01); *H04L 41/5022* (2013.01); *H04L 41/5074* (2013.01)

(58) Field of Classification Search
CPC . H04L 41/06; H04L 41/0604; H04L 41/0609; H04L 41/5022; H04L 41/5074; H04L 51/224; H04L 51/234; H04L 67/535; H04L 67/55
See application file for complete search history.

(56) References Cited

U.S. PATENT DOCUMENTS

| | | | |
|---|---|---|---|
| 5,475,738 A * | 12/1995 | Penzias | H04L 51/066 379/88.13 |
| 9,866,464 B1 * | 1/2018 | Miltenberger | H04L 41/5074 |
| 11,902,111 B1 * | 2/2024 | McKim | H04L 41/5074 |

(Continued)

OTHER PUBLICATIONS

International Search Report dated Mar. 8, 2023, issued in International Application No. PCT/US2022/049558.
(Continued)

*Primary Examiner* — Vivek Srivastava
*Assistant Examiner* — William C McBeth
(74) *Attorney, Agent, or Firm* — Sughrue Mion, PLLC

(57) ABSTRACT

A data payload is generated to describe an event, and includes a priority value indicating a level of urgency for response. Text-based notifications are generated to have text content based on the payload contents and formatted according to a format standard for one or more text transmission services, and then transmitted to user devices. Additionally, audio-based notifications, having audio content based on the payload contents, are selectively generated and transmitted based on the priority value of the data payload, on an elapsing of a time duration associated with the priority value of the data payload, and on acknowledgment states of the user devices. In this manner, a two-stage event notification providing both text-based notifications and escalated audio-based notifications is achieved.

15 Claims, 4 Drawing Sheets

(56) References Cited

U.S. PATENT DOCUMENTS

| | | | | |
|---|---|---|---|---|
| 2004/0044736 | A1* | 3/2004 | Austin-Lane | H04L 67/535 709/206 |
| 2006/0240803 | A1* | 10/2006 | Valeriano | H04L 67/55 455/412.1 |
| 2009/0077191 | A1* | 3/2009 | Bristow | H04L 51/214 709/207 |
| 2009/0213852 | A1* | 8/2009 | Krishnamurthi | H04L 51/234 370/389 |
| 2011/0298614 | A1* | 12/2011 | Bells | G06Q 10/109 340/539.13 |
| 2013/0185369 | A1* | 7/2013 | Bain | H04L 51/224 709/206 |
| 2013/0346521 | A1* | 12/2013 | Arabo | H04L 67/55 709/206 |
| 2014/0327547 | A1* | 11/2014 | Johnson | H04L 51/214 340/601 |
| 2015/0106121 | A1* | 4/2015 | Muhsin | G16H 50/30 705/2 |
| 2015/0350148 | A1* | 12/2015 | Kenney | H04L 51/224 709/206 |
| 2016/0248865 | A1* | 8/2016 | Dotan-Cohen | H04L 67/55 |
| 2018/0270353 | A1* | 9/2018 | Mitchell | H04L 51/214 |
| 2020/0334690 | A1* | 10/2020 | Oden | G06Q 10/063114 |
| 2020/0387411 | A1* | 12/2020 | Chu | H04L 51/224 |
| 2021/0092029 | A1* | 3/2021 | Kumar | H04L 41/5074 |
| 2023/0068374 | A1* | 3/2023 | Zhang | H04L 41/06 |

OTHER PUBLICATIONS

Written Opinion dated Mar. 8, 2023, issued in International Application No. PCT/US2022/049558.

* cited by examiner

SYSTEM AND METHOD FOR TWO-STAGE EVENT NOTIFICATION

CROSS REFERENCE TO RELATED APPLICATIONS

This application is a National Stage of International Application No. PCT/US2022/049558 filed Nov. 10, 2022.

BACKGROUND

1. Field

Apparatuses and methods consistent with example embodiments relate to an event notification system, and more particularly, to a two-stage event notification system providing a text-based notification for all events and an escalated audio-based notification for high priority events.

2. Description of Related Art

For an organization providing computer services, either internal or external, a dedicated support team is expected as part of the service. In many cases, contractual obligations between the organization and their clients require that the support team be not only available, but responsive within a period of time. Such obligations may be established by, for example, one or more service level agreements.

A "ticketing" system is typically provided, enabling users to submit "tickets" to request support team assistance. An interface of the system is typically configured as a form, with fields permitting entry of various details of the issue needing support. Once the form is completed, the entered details can be sent to the support team, who can respond to the issue appropriately.

SUMMARY

It is an object of the disclosed system and method to provide efficient communication of support ticket contents and other event notifications to selected recipients.

It is another object of the disclosed system and method to provide this communication in multiple formats for greater convenience and flexibility to the recipients.

It is yet another object of the disclosed system and method to provide timely escalated communication for urgent notifications.

It is still another object of the disclosed system and method to provide greater robustness of operation in the face of technical problems.

In accordance with certain embodiments of the present disclosure, a method is provided for two-stage event notification. The method includes obtaining a data payload generated to describe an event. Contents of the data payload include a priority value indicating a level of urgency for response to the event. The method further includes generating at least one text-based notification including text content formatted according to a format standard for a text transmission service. The text content is based on the contents of the data payload. The method further includes transmitting the at least one text-based notification to at least one user device. The method further includes selectively generating an audio-based notification including audio content, based on the priority value of the data payload, on an elapsing of a time duration associated with the priority value of the data payload, and on an acknowledgment state of the at least one user device. The audio content is based on the contents of the data payload. The method further includes transmitting the audio-based notification to the at least one user device.

In accordance with other embodiments of the present disclosure, a non-transitory computer-readable recording medium is provided. The recording medium has recorded thereon instructions executable by at least one processor to perform a method for two-stage event notification. The method includes obtaining a data payload generated to describe an event. Contents of the data payload include a priority value indicating a level of urgency for response to the event. The method further includes generating at least one text-based notification including text content formatted according to a format standard for a text transmission service. The text content is based on the contents of the data payload. The method further includes transmitting the at least one text-based notification to at least one user device. The method further includes selectively generating an audio-based notification including audio content, based on the priority value of the data payload, on an elapsing of a time duration associated with the priority value of the data payload, and on an acknowledgment state of the at least one user device. The audio content is based on the contents of the data payload. The method further includes transmitting the audio-based notification to the at least one user device.

In accordance with still other embodiments of the present disclosure, a system is provided for two-stage event notification. The system includes at least one communication module configured to transmit and receive a signal, at least one non-volatile memory electrically configured to store computer program code, and at least one processor operatively connected to the at least one communication module and the at least one non-volatile memory. The at least one processor is configured to operate as instructed by the computer program code. The computer program code includes payload code configured to cause at least one of the at least one processor to obtain a data payload generated to describe an event. Contents of the data payload include a priority value indicating a level of urgency for response to the event. The computer program code further includes first notification code configured to cause at least one of the at least one processor to generate at least one text-based notification including text content formatted according to a format standard for a text transmission service. The text content is based on the contents of the data payload. The computer program code further includes first transmission code configured to cause at least one of the at least one processor to transmit the at least one text-based notification by the at least one communication module to at least one user device. The computer program code further includes second notification code configured to cause at least one of the at least one processor to selectively generate an audio-based notification including audio content, based on the priority value of the data payload, on an elapsing of a time duration associated with the priority value of the data payload, and on an acknowledgment state of the at least one user device. The audio content is based on the contents of the data payload. The computer program code further includes second transmission code configured to cause at least one of the at least one processor to transmit the audio-based notification by the at least one communication module to the at least one user device.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
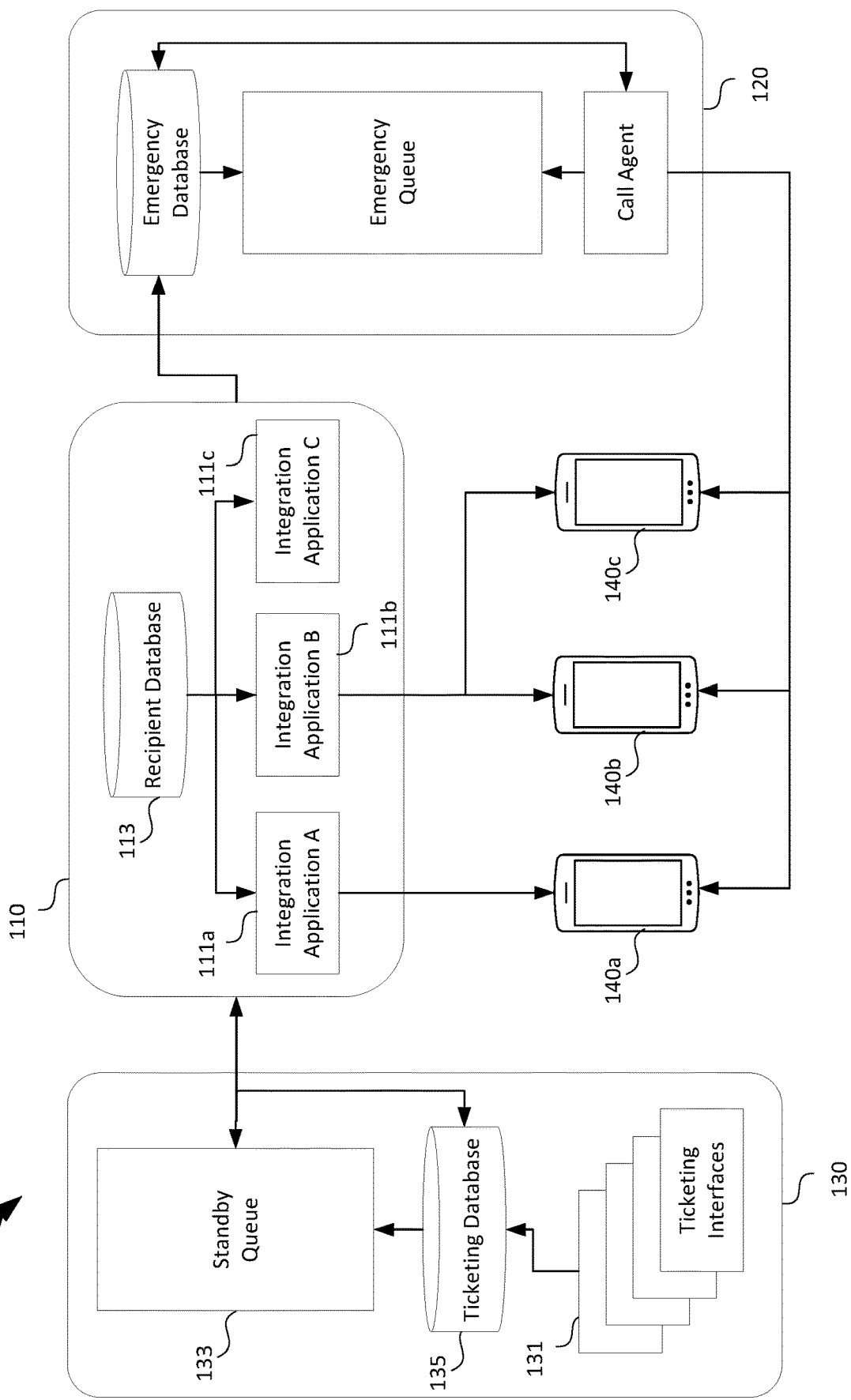
FIG. 1 is a block diagram illustrating a system for two-stage event notification, in accordance with an exemplary embodiment.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As noted briefly in the Background, a technical support team may have a ticketing system which enables a user to provide support tickets describing an event or matter of concern to be resolved. The terms "event" and "matter" will be used interchangeably herein to generally describe an occurrence or state for which a notification is desirable. In the context of a technical support ticket, such matters can vary widely; a few non-limiting examples can include a server outage, a corrupted file, an account being locked due to login authentication failure, and a failure to understand operation of a software feature.

The interface for the ticketing system may include a ticket entry form interface which provides one or more data fields for entry of data. Various fields in the form interface may take the form of dropdown menus, radio button series, checkbox series, date and date time boxes, file uploads, and text boxes and text areas, among other suitable options. A user may fill some or all of the fields, and then actuate submission of the form to convert the contents of the fields into a data payload for transmission. The data payload for the ticket may also include supplementary data which was not entered into the form by the user, such as an identifier of the user retrieved from a login, a generated timestamp, and a form identifier.

The ticket, and its data payload, may include a priority value indicating a level of urgency. An enumerated set of possible priority values may be pre-established—as one non-limiting example: "Trivial," "Minor," "Major," and "Critical". Alternatively, a priority value may be defined on a linear scale, for example, ranging from zero to ten.

The priority value for a given ticket may be manually set by the user, as one of the data values entered into the ticket entry form interface.

In another embodiment, the priority value may be determined from other data values entered into the ticket entry form. A logic or algorithm may determine a priority value based on, as one non-limiting example, a defined status of the user or client making the entry, an identified source of the matter (e.g. a specified application which is malfunctioning), a general type of the matter (e.g. "Login Issue", "Data Loss", etc.) which may be selected from an enumerated list, and whether the ticket was submitted during normal business hours or after hours.

In yet another embodiment, the ticket entry form interface may be selectively provided to a user from among a plurality of form interfaces, and the priority value will be based on the interface provided and thereby used. As one non-limiting example, a user may be provided with a different interface when submitting a ticket through one application than through another. As another non-limiting example, a user may be provided with different controls, such as website links, which are described as for submitting tickets for different purposes, and one of a plurality of form interfaces is provided according to the selected control. As still another non-limiting example, a different interface may be provided to a user with administrator or support team status than to users with other status levels. In each example, a ticket submitted through one interface may include a different priority value than a ticket submitted through another interface. As one non-limiting example, a ticket submitted through an interface accessed by a "Report Server Outage" control may have a priority value indicating a higher urgency than a ticket submitted through an interface accessed by a "Report Software Bug" control.

The three embodiments above may also be combined in various ways. As one non-limiting example, a user may be provided with a first form interface if logged in as an administrator but a second form interface if logged in as a standard user, where the standard user interface allows selection of an "urgency" of 1, 2, or 3 while the administrator interface allows selection of an "urgency" of 1, 2, 3, 4, or 5, and the urgency value is used as part of an algorithm in combination with other entered data to determine the priority value.

The tech support team may, either as a contractual obligation or as a matter of policy, have a goal of responding to a ticket within a particular time duration. The time duration may begin at the time the ticket is submitted, or alternatively at the time the issue arose or is reported to have arisen. Additionally, different types of matters may use different starting times.

The time duration may depend on the priority value, such that a priority value indicating greater urgency may be associated with a shorter time duration than a priority value indicating lesser urgency. For priority values defined on linear scale, a time duration may be calculated based on the priority value, while for enumerated priority values, a time duration may be pre-associated with each priority value. In either alternative, certain priority values—for example, for priority values indicating urgency below a predefined threshold—may have no associated time duration (or, rather, are associated with an infinite time duration) in that there is no upper limit to how long the tech support team is expected to take to respond to the ticket.

For simplicity, going forward, a system and method will be described in which two enumerated priority values exist: a "trouble ticket" with no associated time duration, and an "emergency ticket" with an associated time duration of thirty minutes. Those of ordinary skill will be able to apply the principles disclosed below to more complex sets of priority values.

Once the ticket is submitted, its contents may be stored in a database for access by tech support personnel. The tech support personnel may review the ticket and respond appropriately. In reviewing the ticket, the tech support personnel may alter a resolution state of the ticket to indicate that the ticket is under review. Once the matter is resolved, the tech support personnel may further alter the resolution state of the ticket to indicate that the matter is resolved and need not be addressed further; that is, the personnel may "close" the ticket.

To ensure timely review of a new ticket—in particular, review within the time duration associated with the priority value of the ticket—a notification may be automatically transmitted to a user device of at least one selected tech support personnel, so that the tech support personnel is alerted to respond. The tech support personnel, or a group thereof, may be automatically selected based on contents of the ticket—e.g. if the ticket contents indicate a server outage, a support team located at or near a server hub may be selected—as well as other factors such as present availability of the personnel.

FIG. 1 is a block diagram illustrating a system 100 for two-stage event notification, in accordance with an exemplary embodiment.

A ticket may be entered by a user through, for example, ticketing interfaces 135 previously described herein, which are enabled by a technical support platform 130. The ticketing interfaces 135 may convert the entered data into a data payload as described above, such that the data in each field is associated with a predetermined label. The data payload may be in any suitable format for storage of data associated with a plurality of predetermined labels, including but not limited to 3ML files, comma separated value files, and "spreadsheet" files. It is noted that the ticket and/or the corresponding data payload be alternatively be generated by outside systems and transmitted to the system 100.

The data payload may be stored to a ticketing database 131, which may be implemented on a memory of the technical support platform 130, or of a separate system associated therewith. The ticketing database 131 may be later accessed by tech support personnel for review of the tickets, as well as users to check on the status of the ticket.

The data payload may also be transmitted to a notification server 110. It is noted that the data payload transmitted to the notification server 110 may be of a different format than the payload stored to the ticketing database 131, which may be respectively selected according to suitability and convenience for the respective functions of the database 131 and notification server 110.

The notification server 110 may select which personnel are to manage the ticket as described previously. These personnel may thereby be designated as intended recipients of a notification regarding the ticket. The notification server 110 may then determine a user device 140 associated with each selected recipient, and may transmit a notification to each said user device 140.

The user device 140 may be any device suitable for receiving message transmissions, including but not limited to a personal computer, laptop, or tablet computer, or a smartphone or "dumb" phone. For ease of illustration, only three user devices 140 (namely, first, second, and third user devices 140a, 140b, 140c) are depicted, but it will be understood that the notification server 110 may send a notification to any arbitrary number of user devices 140.

The notification may be text-based; that is, it may contain text content intended to be read from a screen or other visual output of the user device 140. The text content may be generated based on the contents of the ticket's data payload, formatted according to a format standard for a text transmission service (frequently termed a "text messaging service"). The user device 140 may be configured to receive and display text content of this format, through installation and configuration of an application provided by the text transmission service. The user may thereby receive the message through the text transmission service and thereby receive and read relevant information about the ticket through the application. Such text transmission services typically also provide third party integration applications which may be configured on the notification server 110 to transmit the text-based notifications to the appropriate application on the user device 140. Examples of text transmission services include, but are not limited to, SMS, WhatsApp®, Microsoft Teams®, Zoom®, Slack®, Messenger, and Twilio®.

When a tech support team is not operating at a central location, the user device is more likely to be a personal device than a company-provided device. The user device configuration might not be predictable, and in particular might not be configured to receive messages from a particular text transmission service; that is, it might not have the proper application installed and configured. A result of this may be that the tech support team, as a whole, uses disparate text transmission services. One solution is to make it a work requirement that all such user devices be reconfigured to receive messages from the same text transmission service. However, a more flexible approach may be desirable.

Therefore, in certain embodiments, a plurality of third party integration applications 111 are implemented on the notification server 110, each corresponding to a different text transmission service. For ease of illustration, only three integration applications 111 (namely, first, second, and third integration applications 111a, 111b, 111c) are depicted, but it will be understood that the notification server 110 may have any arbitrary number of integration applications 111 implemented thereon.

Each potential recipient of a notification (e.g. each tech support personnel) may have associated information stored in a recipient database 113, which may be implemented on a memory of the notification server 110, or of a separate system associated therewith. This information may be previously provided in a suitable configuration process. The information for each user may include identification of a preferred text transmission service and a "handle" or other user identifier used by that service to direct a message to the user. That a text transmission service is "preferred" by a recipient may indicate that the corresponding application is present, installed, and configured on a user device of the recipient, and that the recipient wishes to receive text-based notifications of tickets through that application.

When a user is selected as a recipient for a text-based notification, text content for a text-based notification is generated based on the contents of the data payload and formatted according to the format standard for the preferred text transmission service of the recipient. Then, the integration application 111 corresponding to the preferred text transmission service of the recipient is selected, and used to transmit the text-based notification according to the user identifier, thereby transmitting the notification to the user device of the recipient.

Such is done for each recipient according to their preferred text transmission service. As an example, in FIG. 1, three recipients have been selected. A first recipient in possession of first user device 140a has indicated a preference for a first text transmission service associated with first integration application 111a, and second and third recipients in possession of second and third user devices 140b, 140c have indicated a preference for a second text transmission service associated with second integration application 111b. Therefore, a first text-based notification is generated according to the format standard for the first text transmission service, and transmitted to the first user device 140a by the first integration application 111a; likewise, a second text-based notification is generated according to the format standard for the second text transmission service, and transmitted to the second and third user devices 140b, 140c by the second integration application 111b.

It will be observed that, in the depicted example, the second and third recipients receive the same (second) text-based notification, which therefore does not need to be generated twice. Personalizing alterations to the text-based notification, such as the name of the recipient, may in certain embodiments be added shortly before each transmission.

It will also be observed that, in the depicted example, the third integration application 111c is not used, as no presently-selected recipients have indicated a preference for the associated third text transmission service. As a result, no third text-based notification corresponding to that service or application need be generated.

By including a notification server 110 implementing a plurality of third party integration applications 111, the disclosed system and method may provide support ticket contents and other event notifications in multiple formats, and thereby provide greater convenience and flexibility to the recipients.

As previously noted, the ticket—that is, the event or matter—may have an associated priority value, which indicates a level of urgency for response to the matter. This priority value may correspond to a time duration within which a response is required. If one or more of the selected recipients of the notification does not acknowledge promptly, such that the time duration is at risk of elapsing without the ticket being addressed, escalated notification measures may be desired.

Each recipient selected for notification regarding a ticket may therefore have an acknowledgement state corresponding to their user device and to the ticket. This state defaults to an "unacknowledged" state, indicating that the ticket has not yet been acknowledged.

Each recipient may reply to a notification with an acknowledgment of receipt. Receipt of the acknowledgement may automatically alter an acknowledgement state for the recipient's user device with respect to the ticket, to an "acknowledged" state. In certain embodiments, an acknowledgement state for the recipient and user device is instead altered by the recipient accessing the ticket on the ticketing database 131.

It may be that a recipient does not acknowledge before a time duration associated with the ticket, and more specifically with its priority value, has elapsed. If the time duration was equal to the period of time within which the recipient is expected to respond to the ticket, it is too late to do anything to cause the recipient to respond in a timely manner. Therefore, instead of the time duration representing this period, the time duration associated with the priority value instead may be a duration shorter than this expected response period, providing a margin within which the recipient can still reasonably respond. This time duration may be predefined suitably for the needs of the implementation.

Should the time duration elapse with the acknowledgment state still in an "unacknowledged" state, an emergency call server 120 may provide a second stage or "escalated stage" notification. More specifically, as a telephone call is more likely to attract the attention of the recipient than a text-based notification, the emergency call server 120 may provide an audio-based notification in the form of a telephone call or similar.

The emergency call server 120 may include an emergency queue 121, a call agent application 123, and an emergency database 125.

The emergency database 125 may receive and store copies of data payloads received from the notification server 110. The data payloads, or data payload identifiers which can be used to locate the data payloads in the emergency database 125, may also be placed or listed in the emergency queue 121, which may be implemented as a first-in-first-out (FIFO) queue.

The call agent application 123 may retrieve data payloads in the order indicated by the emergency queue 121. The call agent application 123 may then generate an audio-based notification; that is, the notification may contain audio content intended to be heard from a speaker or other audio output of the user device 140. The audio content may be generated based on the contents of the retrieved data payload.

The call agent application 123 may transmit the audio-based notification to the user device 140 of the recipient. This transmission may be by way of a telephone network, with the user device 140 identified by a phone number. This phone number may, like the preferred text transmission service and user identifier of the recipient, be included in the associated information of the recipient previously provided and stored in a recipient database 113. The emergency call server 120 may access the recipient database 113 directly, or the notification server 110 may append the phone number to the data payload before providing it to the emergency call server 120.

Use of other audio transmission services is within the scope of this disclosure, but for reasons of brevity will not be detailed herein. Those of skill in the art will understand how to apply the principles herein to other such services.

The above description assumes that the data payloads are transmitted to the emergency call server 120 when the time duration has elapsed, which may be determined by the notification server 110, and the corresponding audio-based notification is promptly generated and transmitted. In a different embodiment, the data payloads may be transmitted to the emergency call server 120 immediately after the text-based notification is transmitted. The emergency call server 120 may determine when the time duration has elapsed, and may store the data payload in the emergency database 125 until that time, then may list the data payload in the emergency queue 121. The audio-based notification may be preemptively generated based on the data payload, and such may be placed in the emergency queue 121 in place of or in association with the data payload.

The notification server 110 may transmit a data payload to the emergency call server 120 if the priority value of the data payload indicates a "high priority." In various embodiments, a high priority may be any priority value associated with a time duration, or a priority value specifically designated as for escalated notifications. For example, in an implementation with three enumerated priority values, each with an associated time duration, it is within the scope of the disclosure that only the priority value or two priority values with the shorter or shortest associated time durations (that is, the "most urgent" of the priority values) are designated as for escalated notifications, such that data payloads with the remaining priority value (the "least urgent" priority value) are not transmitted to the emergency call server 120. Such a configuration may be suitable when the least urgent priority value, although ideally managed within a designated period, is not so critical to resolve that a recipient's attention should be pulled from other matters.

It will be recognized that other logic may be provided, according to the needs of the specific implementation, to determine whether a given ticket warrants escalated notifications and should be transmitted to the emergency call server 120.

The audio-based notification may contain less information than the corresponding text-based notification, as it can be difficult to quickly yet comprehensibly provide large amounts of information in an audio message. This may be acceptable, as the purpose of the audio-based notification is primarily to bring attention to the earlier text-based notification, which will contain any additional desired information. In light of this, the data payload transmitted to the emergency call server 120 from the notification server 110 may be an abbreviated form of the original data payload for the ticket, containing a subset of the data contents, namely, those which are desired for inclusion in the audio-based notification, and those otherwise necessary for processing by the emergency call server 120. Alternatively, the emergency call server 120 may receive a copy of the original data payload and convert it to the abbreviated data payload before storage. All or a portion of the information associated with the recipient or recipients may also be provided.

To conserve processing power, the emergency queue 121 may be dormant when empty, without the call agent application 123 regularly checking its contents. Upon a determination that a time duration has elapsed, and the placement of the corresponding data payload in the emergency queue 121, the processor making this placement may also determine whether the emergency queue 121 is in a dormant state, and if so, activates the emergency queue 121 by sending a signal directly to the call agent application 123. The call agent application 123 may then operate until the emergency queue 121 is emptied again, upon which it may return the emergency queue 121 to the dormant state.

By including an emergency call server 120 implementing a call agent application 123, the disclosed system and method may supplement an initial text-based notification with an escalated telephone notification, and thereby provide timely escalated communication for urgent notifications.

It is possible that the notification server 110 will be unavailable or otherwise unable to receive or process a new data payload at the time a ticket is entered, due for example to a server or network outage, an unusually high level of activity that has the processor fully occupied, or other reasons. A standby queue 133 may therefore be implemented on the technical support platform 130, which may be implemented as a first-in-first-out (FIFO) queue. If the notification server 110 is not operational for the purposes of receiving a data payload, the data payload, or a data payload identifier which can be used to locate the data payload in the ticketing database 131, may be placed or listed in the standby queue 133. Once the notification server 110 is able to accept transmissions from the technical support platform 130 again, it will indicate this change in operational status, and then the technical support platform 130 will transmit the data payloads in the order indicated by the standby queue 133.

As another measure in case of operational problems with the notification server 110, the operational status of the notification server 110 may be provided to the user providing the ticket, thereby indicating whether or not the system is processing the ticket correctly.

In this context, a processor of the technical support platform 130 may be termed a standby processor, and a processor of the notification server 110 may be termed a notification processor.

By including a technical support platform 130 implementing a standby queue 133, the disclosed system and method may provide a protective measure against a temporarily unavailable notification server 110, and thereby provide greater robustness of operation in the face of technical problems.

It is noted that, although the illustrated components of the system 100 are depicted as separate units, any two or more of these components may be implemented on the same physical hardware, sharing memory units, processors, and/or other hardware components. Likewise, the functions of any depicted unit may be split between a plurality of physical hardware units.

Figure 2:
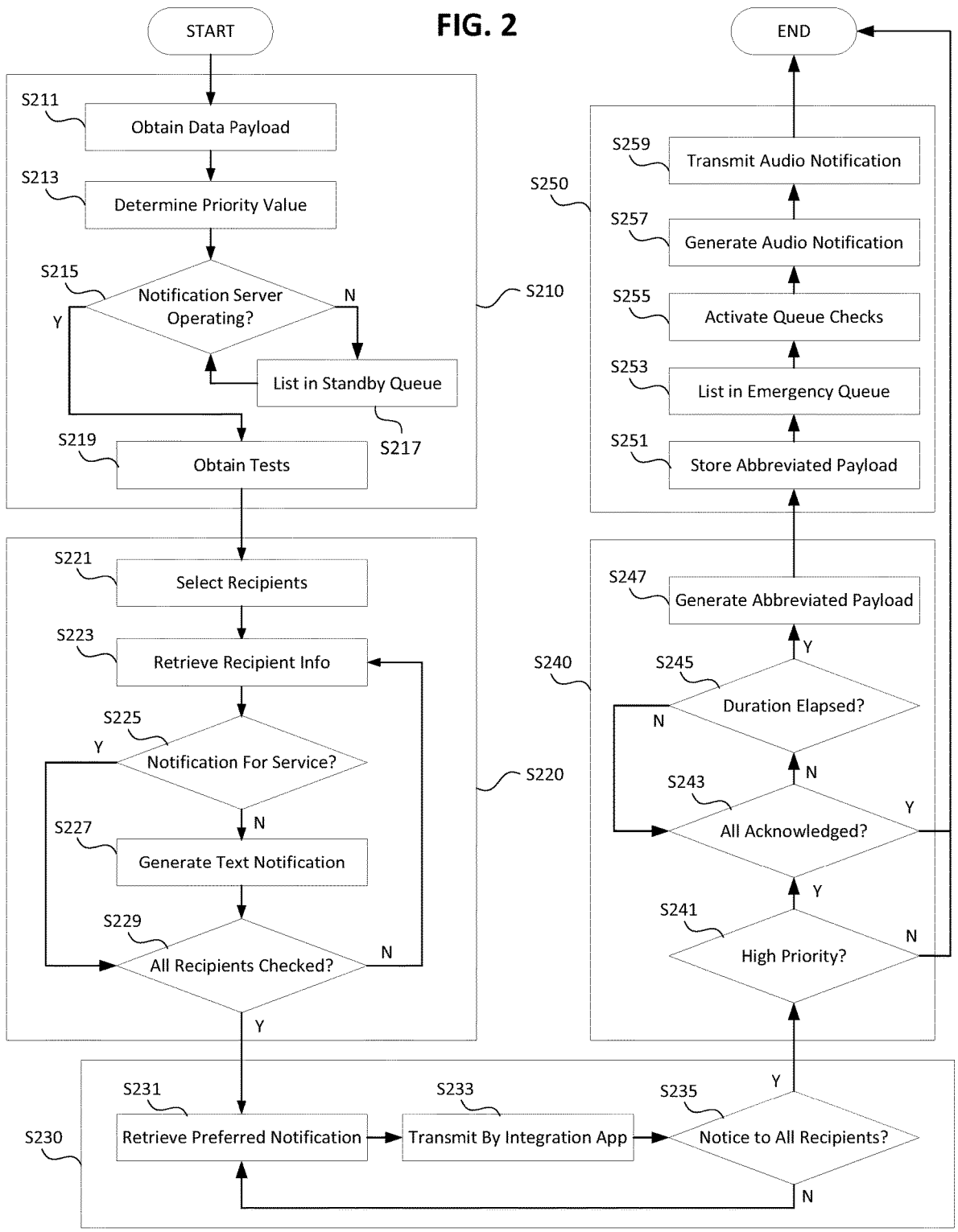
FIG. 2 is a flow diagram illustrating a flow of processes for two-stage event notification, in accordance with an exemplary embodiment.

FIG. 2 is a flow diagram illustrating a flow of processes for two-stage event notification, in accordance with an exemplary embodiment.

At S210, a data payload may be obtained and prepared for processing. These operations may be executed by a processor of a technical support platform, such as technical support platform 130, although they are not limited thereto.

Specifically, at S211, a data payload may be obtained, which has been generated to describe a matter or event, for example, a matter in need of technical support, described in a submitted technical support ticket. The payload may have been generated by a ticketing interface, such as ticketing interface 135.

At S213, a priority value for the data payload may be determined. The value may be determined according to at least a subset of data values already in the generated data payload. The value may also be determined according to which of a plurality of ticketing interfaces was selectively provided for entry of data values already in the generated data payload. Alternatively, a priority value may have already been provided during generation of the data payload.

At S215, it may be determined whether a notification processor, such as a processor of notification server 110, can receive and process a data payload, according to its operational status. If so ("Yes" at S215), the data payload may be transmitted at S219. If not ("No" at S215), then at S217, a standby processor, such as a processor of technical support platform 130, may list the data payload or an identifier indicating the data payload in a standby queue, such as standby queue 133, if not already listed. The method may then return to S215 and repeat the loop until S215 proceeds to S219, at which time the standby processor may transmit the data payload.

At S220, at least one text-based notification may be generated based on the data payload. These operations may be executed by a processor of a notification server, such as notification server 110, although they are not limited thereto.

Specifically, at S221, recipients for the notification may be selected.

At S223, for one of the selected recipients, corresponding information may be retrieved from a recipient database, such as recipient database 113, and a preferred text transmission service may be identified from the corresponding information. At S225, it may be determined whether a text-based notification has been generated for this service on the basis of the present data payload.

If so ("Yes" at S225), the flow may go straight to S229. If not ("No" at S225), first, at S227, a text-based notification may be generated for the preferred text transmission service, including text content formatted according to a format standard for the text transmission service and based on the contents of the present data payload.

At S229, it may be determined whether information has been retrieved for all selected recipients. If not ("No" at S229), the flow may return to S223 for a different recipient. If so ("Yes" at S229), the flow may continue to S330.

At S230, the text-based notification or notifications may be transmitted to user devices of the selected recipients. These operations may be executed by a processor of a notification server, such as notification server 110, although they are not limited thereto.

Specifically, at S231, for one of the selected recipients, the text-based notification corresponding to the preferred text transmission service of that recipient may be retrieved. Then at S233, a third party integration application corresponding to the preferred text transmission service of that recipient, such as integration application 111, may be actuated to transmit the retrieved text-based notification to the user device of the recipient, such as user device 140.

At S235, it may be determined whether a text-based notification has been transmitted to all selected recipients. If not ("No" at S235), the flow may return to S231 for a different recipient. If so ("Yes" at S235), the flow may continue to S240.

At S240, it may be determined whether an audio-based notification should be selectively generated based on the data payload. These operations may be executed by a processor of a notification server, such as notification server 110, although they are not limited thereto.

Specifically, at S241, it may be determined whether the priority value of the data payload indicates "high priority." This may be determined in various ways according to embodiments disclosed previously. If not ("No" at S241), the flow may end immediately. If so ("Yes" at S241), the flow may continue to S243.

At S243, it may be determined whether an acknowledgement state for all recipients or the user devices thereof is "acknowledged." If so ("Yes" at S243), the flow may end immediately. If not ("No" at S243), the flow may continue to S245. The acknowledgement states may also be logged and updated for each iteration of S243.

At S245, it may be determined whether a time duration associated with the priority value of the data payload has elapsed. The time duration may be predetermined for the priority value, and may be a duration shorter than a period of time within which a recipient is expected to respond based on the priority value. If not ("No" at S245), the flow may return to S243 to again check on the acknowledgment state of the recipients. If so ("Yes" at S245), it may be determined that an audio-based notification should be selectively generated, and the flow may continue to S247.

At S247, an abbreviated form of the data payload may be generated, containing a subset of the data contents, which may be selected as described previously. The flow may then continue to S250.

At S250, an audio-based notification may be generated and transmitted based on the data payload. These operations may be executed by a processor of an emergency call server, such as emergency call server 120, although they are not limited thereto.

Specifically, at S251, the abbreviated data payload is stored to a database, such as emergency database 125. At S253, the abbreviated data payload or an identifier indicating the abbreviated data payload may be listed in an emergency queue, such as emergency queue 121.

At S255, a call agent application, such as call agent application 123, may be signaled to selectively activate the emergency queue by checking its contents. At S257, the call agent application may retrieve the abbreviated data payload based on the order of the emergency queue, and may generate the audio-based notification, including audio content based on the abbreviated data payload.

At S259, the call agent application may transmit the audio-based notification to a user device of each recipient which did not indicate an "acknowledged" acknowledgment state, according to, for example, the acknowledgment state logs from operation S243. The process then ends.

These and related processes, and other necessary instructions, may be encoded as executable instructions on one or more non-transitory computer-readable media, such as hard disc drives or optical discs, and executed using one or more computer processors, in concert with an operating system or other suitable measures. Likewise, one or more of the above components described above may be implemented as instructions stored on a computer-readable storage medium and executable by at least one processor (and/or may include at least one processor).

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In a software implementation, the software may include a plurality of computer executable instructions, to be implemented on a computer system. Prior to loading in a computer system, the software may reside as encoded information on a suitable tangible, non-transitory, computer-readable storage medium, such as magnetically, optically, or other suitably encoded or recorded media. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing, In certain embodiments, the computer-readable storage medium may take the form of pre-existing data storage (such as "cloud storage") accessible through an operably coupled network means (such as the Internet). A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar. The computer-readable program instructions may execute entirely on a user's computer, partly on the user's computer, as a stand-alone software package, partly on the user's computer and partly on a remote computer or server, or entirely on the remote computer or server. In scenarios involving a remote computer or server, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 3:
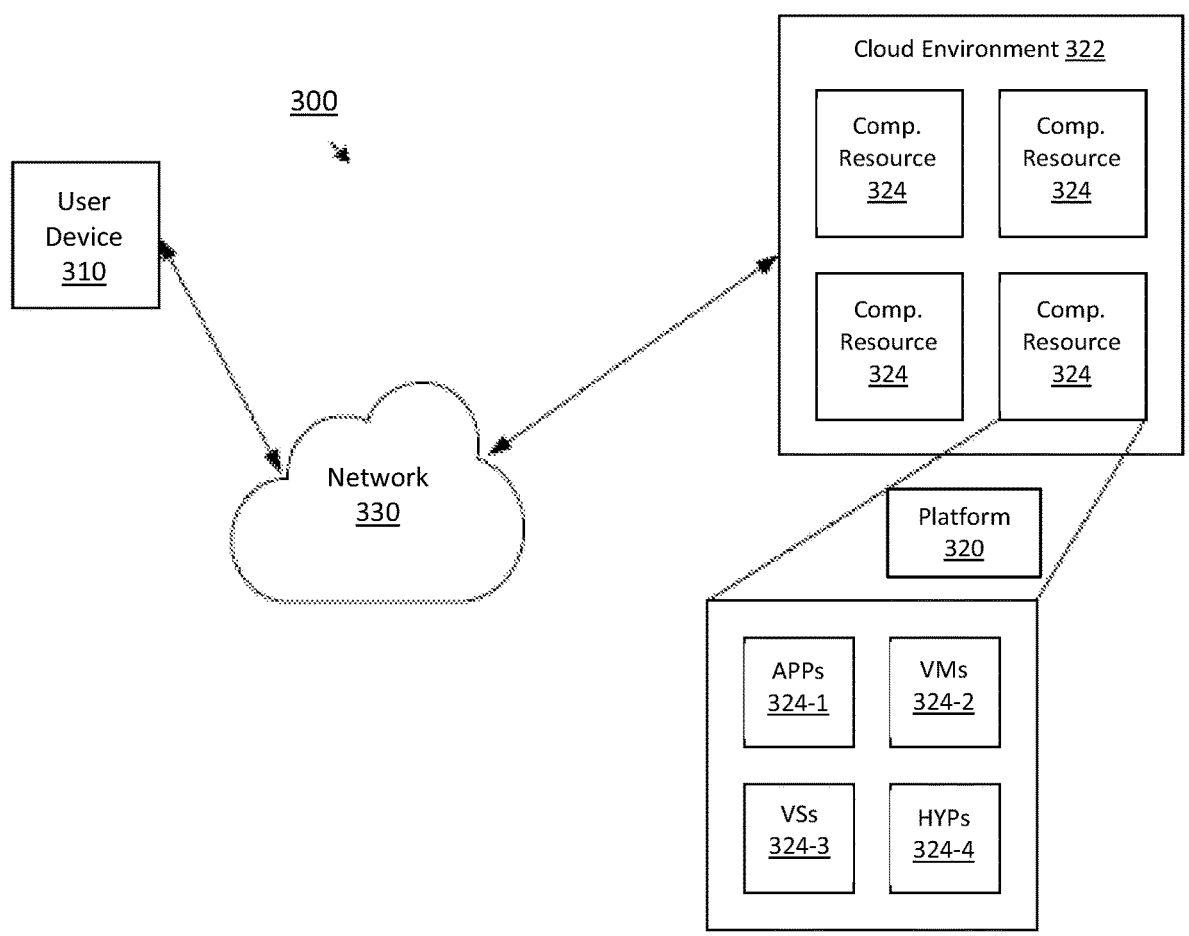
FIG. 3 is a diagram of an example environment in which embodiments of the systems and/or methods described herein may be implemented.

FIG. 3 is a diagram of an example environment 300 in which systems and/or methods, described herein, may be implemented. As shown in FIG. 3, environment 300 may include a user device 310, a platform 320, and a network 330. Devices of environment 300 may interconnect via wired connections, wireless connections, or a combination of wired and wireless connections. In embodiments, any of the functions described with reference to FIG. 1 and operations described with reference to FIG. 2 above may be performed by any combination of elements illustrated in FIG. 3.

User device 310 includes one or more devices capable of receiving, generating, storing, processing, and/or providing information associated with platform 320. For example, user device 310 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 310 may receive information from and/or transmit information to platform 320.

Platform 320 includes one or more devices capable of receiving, generating, storing, processing, and/or providing information. In some implementations, platform 320 may include a cloud server or a group of cloud servers. In some implementations, platform 320 may be designed to be modular such that certain software components may be swapped in or out depending on a particular need. As such, platform 320 may be easily and/or quickly reconfigured for different uses.

In some implementations, as shown, platform 320 may be hosted in cloud computing environment 322. Notably, while implementations described herein describe platform 320 as being hosted in cloud computing environment 322, in some implementations, platform 320 may not be cloud-based (i.e., may be implemented outside of a cloud computing environment) or may be partially cloud-based.

Cloud computing environment 322 includes an environment that hosts platform 320. Cloud computing environment 322 may provide computation, software, data access, storage, etc., services that do not require end-user (e.g., user device 310) knowledge of a physical location and configuration of system(s) and/or device(s) that hosts platform 320. As shown, cloud computing environment 322 may include a group of computing resources 324 (referred to collectively as "computing resources 324" and individually as "computing resource 324").

Computing resource 324 includes one or more personal computers, a cluster of computing devices, workstation computers, server devices, or other types of computation and/or communication devices. In some implementations, computing resource 324 may host platform 320. The cloud resources may include compute instances executing in computing resource 324, storage devices provided in computing resource 324, data transfer devices provided by computing resource 324, etc. In some implementations, computing resource 324 may communicate with other computing resources 324 via wired connections, wireless connections, or a combination of wired and wireless connections.

As further shown in FIG. 3, computing resource 324 includes a group of cloud resources, such as one or more applications ("APPs") 324-1, one or more virtual machines ("VMs") 324-2, virtualized storage ("VSs") 324-3, one or more hypervisors ("HYPs") 324-4, or the like.

Application 324-1 includes one or more software applications that may be provided to or accessed by user device 310. Application 324-1 may eliminate a need to install and execute the software applications on user device 310. For example, application 324-1 may include software associated with platform 320 and/or any other software capable of being provided via cloud computing environment 322. In some implementations, one application 324-1 may send/receive information to/from one or more other applications 324-1, via virtual machine 324-2.

Virtual machine 324-2 includes a software implementation of a machine (e.g., a computer) that executes programs like a physical machine. Virtual machine 324-2 may be either a system virtual machine or a process virtual machine, depending upon use and degree of correspondence to any real machine by virtual machine 324-2. A system virtual machine may provide a complete system platform that supports execution of a complete operating system ("OS"). A process virtual machine may execute a single program, and may support a single process. In some implementations, virtual machine 324-2 may execute on behalf of a user (e.g., user device 310), and may manage infrastructure of cloud computing environment 322, such as data management, synchronization, or long-duration data transfers.

Virtualized storage 324-3 includes one or more storage systems and/or one or more devices that use virtualization techniques within the storage systems or devices of computing resource 324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 324-4 may provide hardware virtualization techniques that allow multiple operating systems (e.g., "guest operating systems") to execute concurrently on a host computer, such as computing resource 324. Hypervisor 324-4 may present a virtual operating platform to the guest operating systems, and may manage the execution of the guest operating systems. Multiple instances of a variety of operating systems may share virtualized hardware resources.

Network 330 includes one or more wired and/or wireless networks. For example, network 330 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
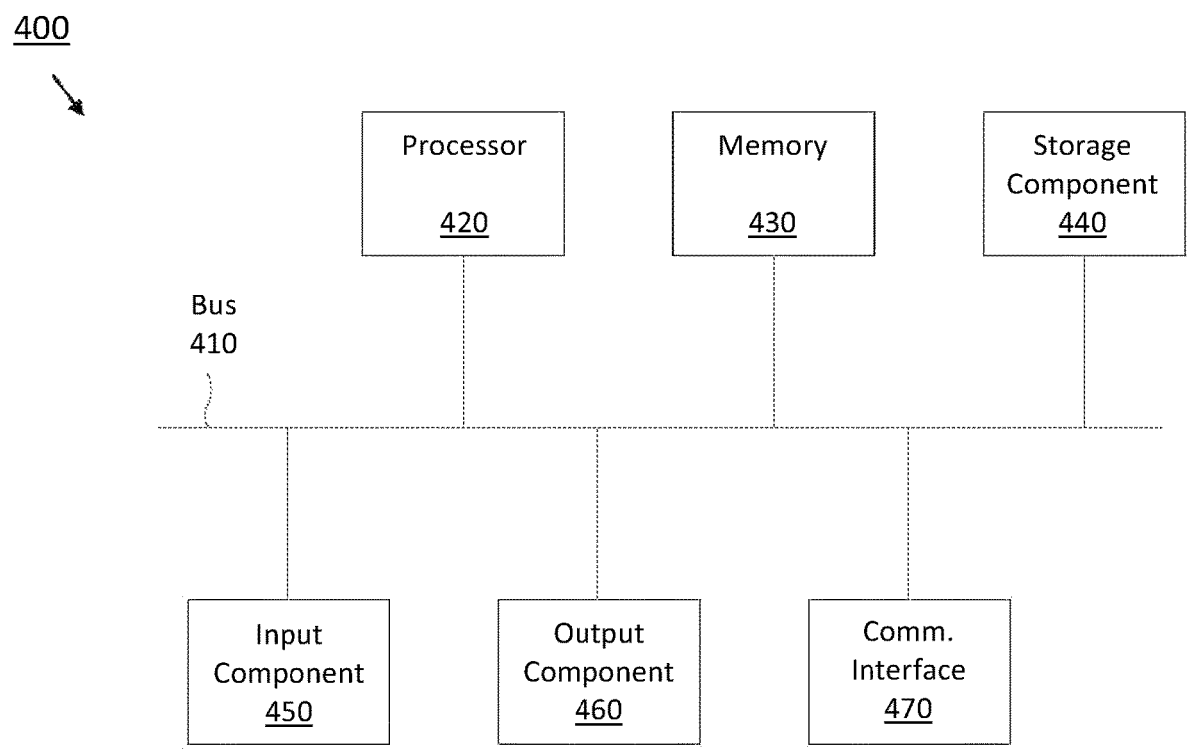
FIG. 4 is a diagram of example components of a device on which embodiments of the systems and/or methods described herein may be implemented.

FIG. 4 is a diagram of example components of a device 400. Device 400 may correspond to user device 310 and/or platform 320, and/or any of notification server 110, emergency call server 120, and technical support platform 130. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

In embodiments, any one of the operations or processes of FIG. 2 may be implemented by or using any one of the elements illustrated in FIG. 4.

Throughout the disclosure, for purposes of clarity, convenience, and brevity, the disclosed system has been primarily described in terms of support tickets for a technical support service, converted to notification messages to transmit to support personnel. However, it is noted that the principles disclosed herein are generally applicable to a wide variety of notifications regarding events for which timely response might be necessary, or even merely preferable. A few non-limiting examples include: a school system notifying a parent of an incident with their child; a doctor's office notifying a patient of an unexpected appointment opening; and a government agency notifying a group of citizens of a hazard to avoid.

The foregoing disclosure provides illustration and description, but is not intended to be exhaustive or to limit the implementations to the precise form disclosed. Modifications and variations are possible in light of the above disclosure or may be acquired from practice of the implementations.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for two-stage event notification, the method comprising, by at least one processor:

obtaining a data payload generated to describe an event, wherein contents of the data payload include a priority value indicating a level of urgency for response to the event; generating at least one text-based notification including text content formatted according to a format standard for a text transmission service, the text content being based on the contents of the data payload;

transmitting the at least one text-based notification to at least one user device;

selectively generating an abbreviated data payload based on the priority value of the data payload, on an elapsing of a time duration associated with the priority value of the data payload, and on an acknowledgment state of the at least one user device, wherein contents of the abbreviated data payload are based on the contents of the data payload;

listing the abbreviated data payload in an emergency queue;

in response to the listing of the abbreviated data payload in the emergency queue:

selectively activating the emergency queue based on a dormant status of the emergency queue;

generating an audio-based notification including audio content, wherein the audio content of the audio-based notification is based on the contents of the abbreviated data payload; and transmitting the audio-based notification to the at least one user device.

2. The method of claim 1,
wherein the transmitting of the at least one text-based notification is by a notification processor; and
wherein the method further comprises, prior to transmitting the at least one text-based notification, by a standby processor different from the notification processor:
selectively listing the data payload in a standby queue based on an operational status of the notification processor, and
selectively transmitting the data payload to the notification processor based on the operational status of the notification processor.

3. The method of claim 1,
wherein the generating of the at least one text-based notification includes generating a plurality of text-based notifications, the text content of each text-based notification of the plurality of text-based notifications being formatted according to a format standard for a corresponding one of a plurality of text transmission services; and
wherein the transmitting of the at least one text-based notification includes selecting one of the plurality of text-based notifications for transmission to the at least one user device based on a presence of an application for one of the plurality of text transmission services on the at least one user device.

4. The method of claim 1,
wherein the data payload further includes a plurality of data values entered by a user; and
wherein the priority value of the data payload is determined based on at least a subset of the plurality of data values.

5. The method of claim 1,
wherein the data payload further includes a plurality of data values entered by a user through a selectively provided interface; and
wherein the priority value of the data payload is determined based on the selectively provided interface.

6. The method of claim 1, wherein the data payload is generated based on a submitted technical support ticket, and the event is a matter in need of technical support.

7. A non-transitory computer-readable recording medium having recorded thereon instructions executable by at least one processor to perform a method for two-stage event notification, the method comprising:

obtaining a data payload generated to describe an event, wherein contents of the data payload include a priority value indicating a level of urgency for response to the event;

generating at least one text-based notification including text content formatted according to a format standard for a text transmission service, the text content being based on the contents of the data payload;

transmitting the at least one text-based notification to at least one user device;

selectively generating an abbreviated data payload based on the priority value of the data payload, on an elapsing of a time duration associated with the priority value of the data payload, and on an acknowledgment state of the at least one user device, wherein contents of the abbreviated data payload are based on the contents of the data payload;

listing the abbreviated data payload in an emergency queue;

in response to the listing of the abbreviated data payload in the emergency queue:

selectively activating the emergency queue based on a dormant status of the emergency queue;

generating an audio-based notification including audio content, wherein the audio content of the audio-based notification is based on the contents of the abbreviated data payload; and transmitting the audio-based notification to the at least one user device.

8. The recording medium of claim 7,
wherein the transmitting of the at least one text-based notification is by a notification processor; and
wherein the method further comprises, prior to transmitting the at least one text-based notification, by a standby processor different from the notification processor:
selectively listing the data payload in a standby queue based on an operational status of the notification processor, and
selectively transmitting the data payload to the notification processor based on the operational status of the notification processor.

9. The recording medium of claim 7,
wherein the generating of the at least one text-based notification includes generating a plurality of text-based notifications, the text content of each text-based notification of the plurality of text-based notifications being formatted according to a format standard for a corresponding one of a plurality of text transmission services; and
wherein the transmitting of the at least one text-based notification includes selecting one of the plurality of text-based notifications for transmission to the at least one user device based on a presence of an application for one of the plurality of text transmission services on the at least one user device.

10. A system for two-stage event notification, the system comprising:
at least one communication module configured to transmit and receive a signal;

at least one non-volatile memory electrically configured to store computer program code; and at least one processor operatively connected to the at least one communication module and the at least one non-volatile memory, the at least one processor being configured to operate as instructed by the computer program code, the computer program code including:

first payload code configured to cause at least one of the at least one processor to obtain a data payload generated to describe an event, wherein contents of the data payload include a priority value indicating a level of urgency for response to the event, first notification code configured to cause at least one of the at least one processor to generate at least one text-based notification including text content formatted according to a format standard for a text transmission service, the text content being based on the contents of the data payload;

first transmission code configured to cause at least one of the at least one processor to transmit the at least one text-based notification by the at least one communication module to at least one user device;

second notification code configured to cause at least one of the at least one processor to selectively generate an audio-based notification including audio content, based on the priority value of the data payload, on an elapsing of a time duration associated with the priority value of the data payload, and on an acknowledgment state of the at least one user device, the audio content being based on the contents of the data payload; and second transmission code configured to cause at least one of the at least one processor to transmit the audio-based notification by the at least one communication module to the at least one user device, second payload code configured to cause at least one of the at least one processor to selectively generate an abbreviated data payload based on the priority value of the data payload, on an elapsing of a time duration associated with the priority value of the data payload, and on an acknowledgment state of the at least one user device, wherein contents of the abbreviated data payload are based on the contents of the data payload;

listing code configured to cause at least one of the at least one processor to list the abbreviated data payload in an emergency queue;

second transmission code configured to cause at least one of the at least one processor to, in response to the listing of the abbreviated data payload in the emergency queue:

selectively activate the emergency queue based on a dormant status of the emergency queue;

generate an audio-based notification including audio content, wherein the audio content of the audio-based notification is based on the contents of the abbreviated data payload; and transmit the audio-based notification to the at least one user device.

11. The system of claim 10, wherein the at least one processor includes at least one notification processor and at least one standby processor different from the at least one notification processor;

wherein the transmitting of the at least one text-based notification is by at least one of the at least one notification processor; and wherein the computer program code further includes standby code configured to cause at least one of the at least one standby processor, prior to transmission of the at least one text-based notification, to:

selectively list the data payload in a standby queue based on an operational status of at least one of the at least one notification processor, and selectively transmit the data payload to at least one of the at least one notification processor based on the operational status of at least one of the at least one notification processor.

12. The system of claim 10, wherein the generating of the at least one text-based notification includes generating a plurality of text-based notifications, the text content of each text-based notification of the plurality of text-based notifications being formatted according to a format standard for a corresponding one of a plurality of text transmission services; and wherein the transmitting of the at least one text-based notification includes selecting one of the plurality of text-based notifications for transmission to the at least one user device based on a presence of an application for one of the plurality of text transmission services on the at least one user device.

13. The system of claim 10, wherein the data payload further includes a plurality of data values entered by a user; and wherein the priority value of the data payload is determined based on at least a subset of the plurality of data values.

14. The system of claim 10, wherein the data payload further includes a plurality of data values entered by a user through a selectively provided interface; and wherein the priority value of the data payload is determined based on the selectively provided interface.

15. The system of claim 10, wherein the data payload is generated based on a submitted technical support ticket, and the event is a matter in need of technical support.

* * * * *